Aug. 15, 1939.    R. M. SMITH    2,169,967
ELECTRICAL LEAD-IN BUSHING
Filed Sept. 27, 1935
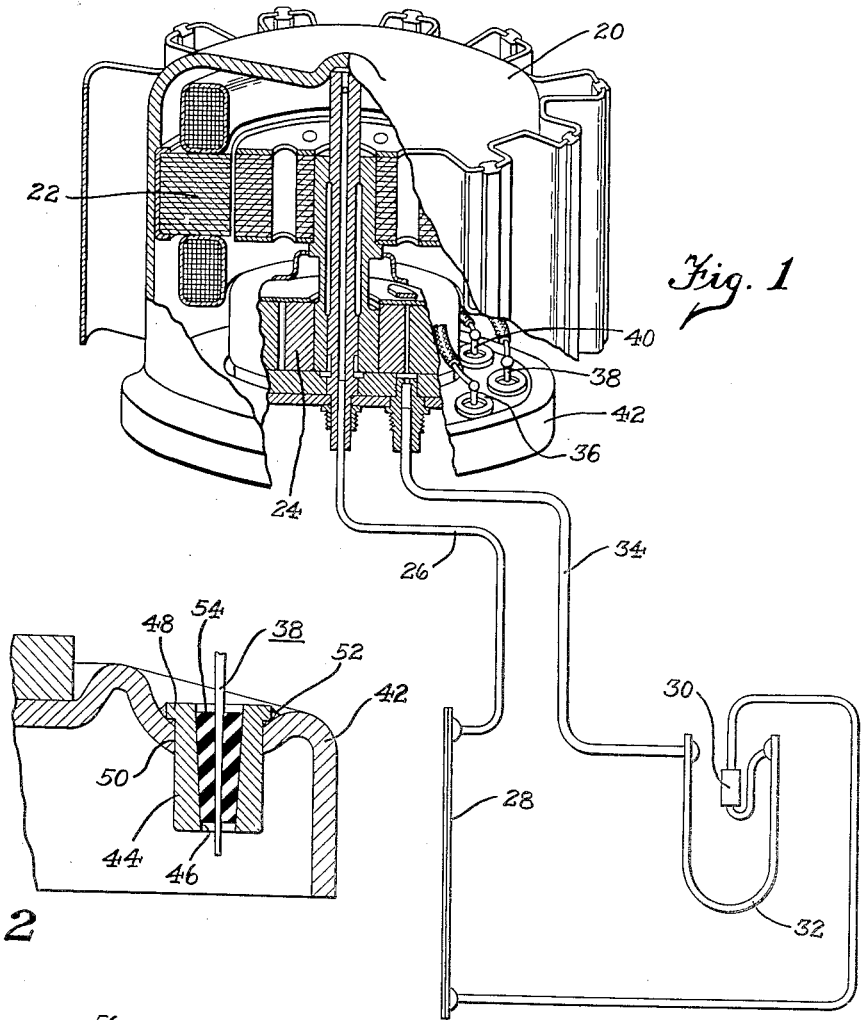
Fig. 1
Fig. 2
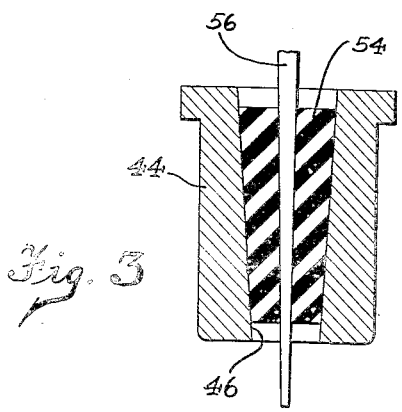
Fig. 3
INVENTOR.
Rolf M Smith
BY
Spencer Hardman and Fehr
ATTORNEYS Patented Aug. 15, 1939

2,169,967

UNITED STATES PATENT OFFICE 2,169,967

ELECTRICAL LEAD-IN BUSHING

Rolf M. Smith, Dayton, Ohio, assignor to General Motors Corporation, Dayton, Ohio, a corporation of Ohio Application September 27, 1935, Serial No. 42,446

2 Claims. (Cl. 174—152)

This invention relates to refrigerating apparatus and more particularly to electrical lead-in bushings for sealed motor compressor units.

For some time different refrigerating manufacturers have been manufacturing refrigerating systems which include a direct connected motor compressor unit inclosed within a sealed metal casing. In order to conduct the electric energy to the electric motor within the casing, it is necessary to provide some means which will not only insulate the electric conductors from the casing but also to prevent the escape of any refrigerant or air from the passage through which the electrical conductors extend.

As a somewhat similar condition existed for spark plugs of internal combustion engines, a somewhat similar construction was first followed with certain variations. Heretofore the lead-in bushings have largely been made of brittle insulating materials such as glass and porcelain which were fused into place in the aperture through which the electric conductors passed. These bushings, because of the fact that they had to be fused into place in order to be made perfectly tight and because of the fact that they were brittle, made this part of the equipment relatively expensive for this simple function. This type of lead-in bushing was also subject to breakage either through careless handling or because of distortion through the changes in temperature.

It is an object of my invention to provide an extremely simple lead-in bushing which need not be fused into place and which has no brittle parts.

It is another object of my invention to provide a simple lead-in bushing requiring no gaskets, which can be readily removed and again replaced in case of necessity.

It is a further object of my invention to provide a durable lead-in bushing which is sealed by a simple wedging action of tapered surfaces.

Further objects and advantages of the present invention will be apparent from the following description, reference being had to the accompanying drawing, wherein a preferred form of the present invention is clearly shown.

In the drawing:

Fig. 1 is a view of a refrigerating system, partly diagrammatic, embodying a sealed motor-compressor unit illustrating one form of my invention;

Fig. 2 is a sectional view of a portion of the motor compressor unit taken through one of the lead-in bushings; and Fig. 3 is an enlarged sectional view through one of the lead-in bushings.

In the form of lead-in bushing, I have disclosed in this application, there is provided a flanged metal bushing which extends through the wall of the sealed casing of the motor compressor unit and has its flanged portion hermetically sealed through by solder or welding. This metal bushing has a tapered aperture extending therethrough which receives a tapered bushing of a phenolic condensation product which likewise has an aperture therethrough tapered in the same direction, which receives a tapered metallic electrical conductor. The insulating bushing is preferably first tightly pressed into place and is sufficiently compressed to make a gas-tight seal with the metal bushing. The tapered electrical conductor is then placed within the tapered aperture in the insulating bushing and forced into place with sufficient force to compress the insulating material and also to make it a gas-tight seal. The ordinary insulated electrical conductors may be connected to the ends of the tapered electrical conductor by soldering or welding or by threaded fastening means if so desired.

Referring now to the drawing, there is shown a sealed metal casing 20 enclosing an electric motor 22 which drives a directly connected rotary refrigerant compressor 24. The refrigerant is drawn into the sealed casing by the compressor and is compressed therein. This compressed refrigerant is discharged from the casing through the conduit 26 which connects to a flat plate type condenser 28 where the compressed refrigerant is liquefied and forwarded under the control of an expansion device 30, preferably a fixed elongated orifice, which controls the flow of the refrigerant to the evaporating means of the cooling unit 32. In the evaporating means 32 the refrigerant evaporates under reduced pressure and is returned to the suction inlet of the compressor through the return conduit 34.

In an ordinary split phase motor three leads are required. These three leads, designated by the reference characters 36, 38, and 40, extend through the bottom metal plate 42 of the sealed metal casing 20. Taking the bushing 38 as an example, there is provided a flanged metal bushing 44 having a tapered aperture 46 extending therethrough. This metal bushing has its periphery cylindrical in shape and has its flanged portion 48, lodged upon the inside of the aperture 50 in the wall 42 of the sealed casing 20. This flange 48 is sealed to the wall 42 by soldering or welding indicated by the reference character 52. Within the tapered bushing 46, an insulating bushing 54 which has a complementary tapered outer surface is wedged in place therein with sufficient tightness to provide a gas-tight seal between the insulating bushing and the metal bushing and to provide sufficient friction to hold the insulating bushing tightly in place.

This insulating bushing may be made of a suitable phenolic condensation product which is relatively hard and yet sufficiently compressible and plastic to flow into any irregularities in the metal bushing. Preferably, however, the tapered surfaces are made sufficiently accurate so that only the most minute irregularities occur. Instead of such a material, a suitable hard rubber product of similar characteristics or a chloroprene product with similar characteristics may be used.

This tapered insulating bushing is provided with a tapered aperture extending therethrough which extends in the same direction as the tapered outer surface of the bushing but which is a lesser taper. Extending through this tapered aperture in the insulating bushing and complementary thereto, is a tapered metallic electrical conductor 56 which may be of nickel, bronze or steel, which is forced into place with sufficient pressure to provide a gas-tight seal between itself and the insulating bushing 54 and to hold the electrical conductor tightly in the bushing. Preferably, the taper of the outer surface of the bushing is from 27° to 30° included angle, while the taper of the electrical conductor is about 15° included angle.

Electrical conductors may be connected to the ends of this tapered metallic electric conductor 56 by soldering, welding or by threaded fastenings. This tapered electrical conductor 56 and the insulating bushing 54 may be readily removed by the application of sufficient force in the proper axial direction and thereafter it may be just as readily replaced.

It will be seen that my improved lead-in bushing is practical, unbreakable, durable, inexpensive, easy to install and remove and has suitable insulating and sealing characteristics for refrigerating systems as well as other applications having lesser requirements such as internal combustion engines or any place where an electrical entry has to be made through a wall made of an electrical conductor.

While the form of embodiment of the invention as herein disclosed, constitutes a preferred form, it is to be understood that other forms might be adopted, all coming within the scope of the claims which follow.

What is claimed is as follows:

1. A gas tight electrical lead-in comprising a receptacle having a tapered aperture therethrough, a tapered bushing shorter in length than said tapered aperture and molded of a hard non-crystalline slightly plastic electrical insulating material fitting tightly within and in direct contact with the tapered aperture of said receptacle, said tapered bushing having a tapered aperture extending therethrough having a lesser included angle than the outside of the tapered bushing, and a tapered electrical conductor extending through and tightly fitting the tapered bushing to form a gas tight insulating seal for the electrical conductor.

2. A gas tight electrical lead-in comprising a receptacle having a tapered aperture therethrough, a tapered bushing shorter in length than said tapered aperture and molded of a hard non-crystalline slightly plastic electrical insulating material fitting tightly within and in direct contact with the tapered aperture of said receptacle, the taper of said tapered bushing having an included angle of between 27 and 30 degrees, said tapered bushing having a tapered aperture extending therethrough having a lesser included angle in the outside of the tapered bushing, and a tapered electrical conductor extending through and tightly fitting the tapered aperture of the tapered bushing to form a gas tight insulating seal for the electrical conductor, the taper of said tapered electrical conductor having included an angle of about 15 degrees, the taper of the receptacle and the taper of the electrical conductor extending in the same direction.

ROLF M. SMITH.